March 8, 1938. F. RICHTER 2,110,239
ELEVATING TAILBOARD MOUNTING
Filed March 27, 1937    2 Sheets-Sheet 2
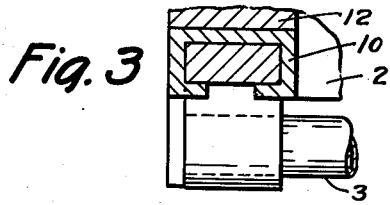
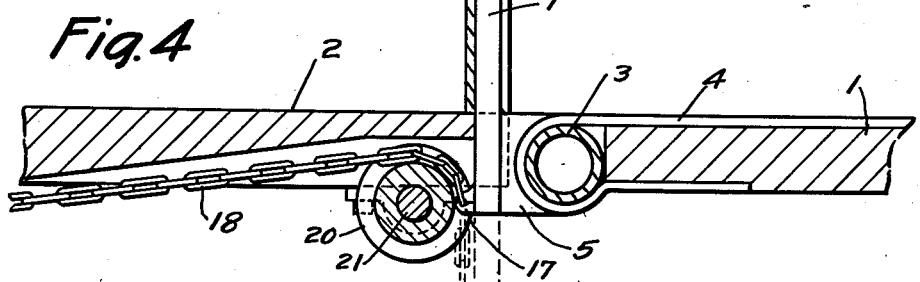
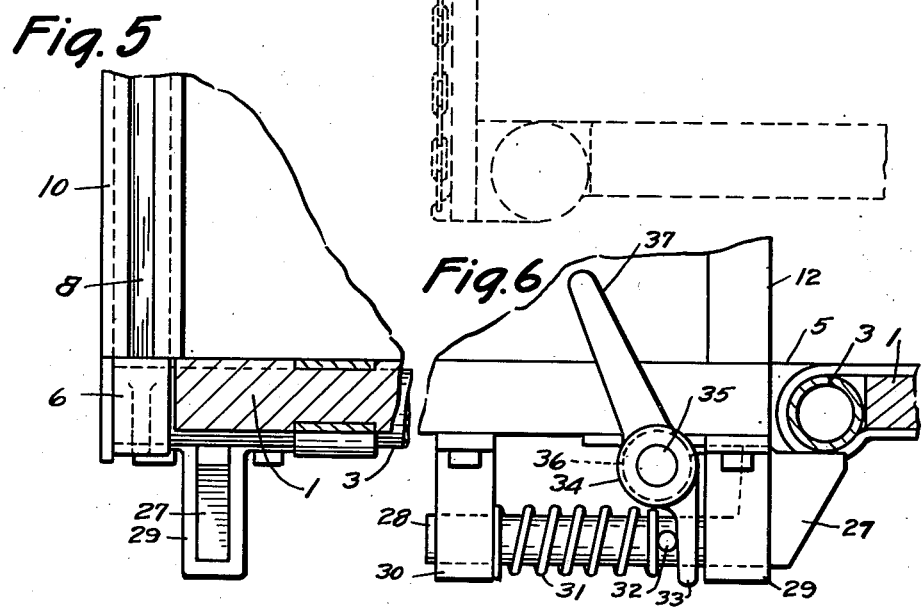
INVENTOR.
Frank Richter
BY James Harrison Bowen
ATTORNEY.

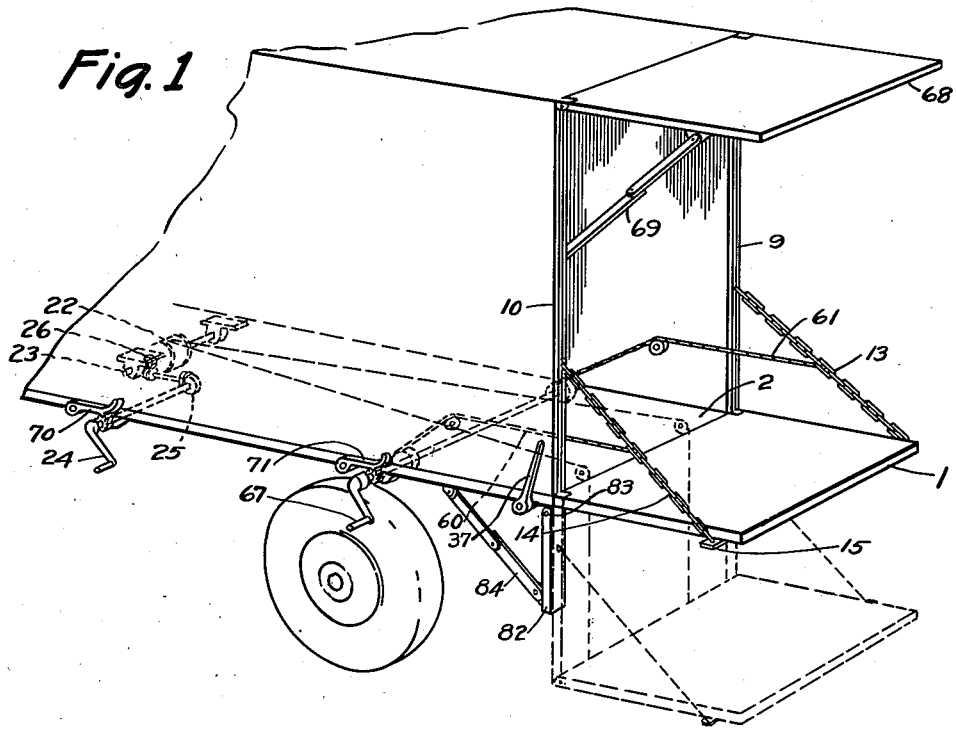

Patented Mar. 8, 1938

2,110,239

UNITED STATES PATENT OFFICE 2,110,239

ELEVATING TAILBOARD MOUNTING

Frank Richter, West New York, N. J., assignor to Mollie E. Richter, Weehawken Township, Hudson County, N. J.

Application March 27, 1937, Serial No. 133,342

11 Claims. (Cl. 214—75)

The purpose of this invention is to provide a mounting for tailboards and the like for trucks and other similar vehicles, in which the tailboard may be opened to a substantially horizontal position, with the upper surface thereof in the same plane with the floor of the truck, or the like, and then lowered substantially to the ground, and then raised with or without a load thereon to the original position, or to any point between the two positions.

The invention is a tailboard mounting, in which the tailboard is hingedly attached to the rear of a truck or the like, and in which the hinge is movably mounted so that it may readily be moved downward or raised, or held at substantially any point between the floor of the truck and ground.

Similar mountings have been provided for tailboards, in which the elevating means is positioned at the opposite sides of the truck body, and each independently operated, or at least operated by elevating means at the opposite corners, and this has been found objectionable, and also requires comparatively complicated mechanism, whereas it has been found that by combining the elevating means in one unit, and placing it in the center of the truck body or at one point, and providing chain, cable, or other flexible connecting means from the said elevating means to a plurality of points in the tailboard, it is possible to elevate the tailboard with a smooth, easy movement, and with relatively simple and inexpensive mechanism.

The object of the invention is, therefore, to provide means for elevating a tailboard of a truck from a plurality of points by a common unit, thereby evenly distributing the load and elevating force.

Another object is to provide elevating means for the tailboard of a truck, or similar article, in which the elevating force is evenly distributed to a plurality of points.

Another object is to provide an elevating tailboard for trucks and the like, in which a positive lock is provided for holding the tailboard in a normal position.

Another object is to provide an elevating tailboard for trucks and the like, in which means is provided for closing the tailboard.

Another object is to provide a mounting for an elevating tailboard for trucks and the like, in which the tailboard may be held at substantially any position.

A further object is to provide mounting means for readily raising and lowering a tailboard of a truck or the like, in which the tailboard may be moved downward by mechanical means, and elevated by hydraulic or other similar means.

And a still further object is to provide a mounting for tailboards of trucks, and the like, in which the tailboard may readily be raised and lowered, which is of a simple and economical construction.

With these ends in view the invention embodies a truck, having a tailboard with a hinge having a bar extending therethrough, with the ends of the bar pivotally mounted in vertical sliders or shoes, and with the sliders mounted in vertical tracks or guides, and with the tailboard held by a plurality of chains connected to the inner edge thereof at points adjacent the sides thereof, and extending backward to a common operating means, in which the said operating means raises both chains with the same force, and with an equal movement; and also in which a positive latch is provided for rigidly holding the tailboard in the normal position. The tailboard is also provided with side chains, suspending it in substantially a horizontal position, with the chains attached to the sliders, and means is also provided for closing the said tailboard.

Other features and advantages of the invention will appear from the following description, taken in connection with the drawings, wherein:

Figure 1 is a view showing a portion of a truck with the tailboard mounted thereon.

Figure 2 is a plan view showing the tailboard in the open position, and showing the connecting means with parts broken away and parts omitted.

Figure 3 is a cross section through the channel shaped guide member at the rear edges of the sides of the truck.

Figure 4 is a detail through the connection between the tailboard and truck, showing the elevating means.

Figure 5 is a detail looking toward the corner at one side of the truck, with the tailboard shown in section, and showing the mounting means between the tailboard hinge and vertical slider.

Figure 6 is a detail similar to that shown in Figure 4, showing one of the spring latches for rigidly holding the tailboard in the normal position, and also the releasing means therefor.

Figure 7 is a detail through the floor of a truck body, showing a tailboard mounting, and operating means of an alternate design.

Figure 8 is a detail showing another alternate design in which a hand operated device is illustrated.

In the drawings the tailboard mounting is shown as it may be made, wherein numeral 1 indicates a tailboard, numeral 2 the floor of a truck body, and numeral 3 a rod or tube forming the hinge of the tailboard, and connecting the tailboard to the truck body.

The mounting between the tailboard and truck body is substantially the same as that of my prior Patent No. 1,695,609, in which the surface of the tailboard is flush, or in the same plane, as the surface of the floor 2 of the truck body; however, it will be understood that the elevating means disclosed in this application is applicable to a tailboard or tailgate mounting of any type or design.

In the design shown the inner edge of the tailboard 1 is mounted upon a rod or tube 3, which is held by straps 4, and the ends of the rod are held in bearings 5 and 6, at the lower ends of sliders 7 and 8, which are slidably mounted in channel shaped members 9 and 10 at the rear edges of the sides 11 and 12 of the truck body. The members 9 and 10 may be mounted in, or upon, the sides in any manner or by any means, and it will also be understood that the sliders 7 and 8 may be slidably mounted in, or on, the edges of the sides of the truck in any manner or by any means. In the design shown, the sliders 7 and 8 extend upward a sufficient distance to hold the upper ends of side chains 13 and 14, and the outer ends of the chains are attached to the ends of a cross member 15 on the tailboard, however, these may be attached to the tailboard in any manner or by any means. The inner ends of the chains may be attached to hooks or eyes 16 on the members 7 and 8, so that they may be removed if it is desired to drop the tailboard. The bearings 5 and 6 at the lower ends of the members 7 and 8 may also be formed in any manner, and it will also be understood that the ends of the member 3 may be mounted in, or attached to, the lower ends of sliders 7 and 8 by any means.

The lower ends of the sliders 7 and 8 are also provided with eyes or other attaching means 17, to which the ends of chains 18 and 19 may be attached as shown in Figure 3, and these chains may pass over idler pulleys 20 on a shaft 21, and then backward to elevating means, preferably positioned in the center of the truck body, and below the floor. In the design shown in Figure 1, a windlass is used as the elevating means, and in this design this is shown in the form of a drum 22, on a shaft 23, and operated by a crank 24 through gears 25 and worm gears 26. It will be noted that in this construction the worm gears provide holding means, so that the tailboard may be stopped and held in substantially any position, and may readily be moved from one position to another by the crank 24.

In Figure 6 a latch member is provided which will move inward to permit the hinge member 3 to move upward to the normal position, and which will slide outward to form a seat for the member 3 when the tailboard is in the normal position, and it will be understood that any number of these latches may be provided across the tailboard mounting; or any means may be provided for locking and holding the tailboard hinge in the normal or upper position. In the design shown, the latch 27, on the end of a bar 28, is slidably mounted in bearings 29 and 30, and resiliently held outward by a spring 31, one end of which bears against the bearing 30, and the other against a pin 32 extending through the latch. The pin engages prongs 33 of a yoke 34 fixedly mounted on a shaft 35, and the shaft, which is mounted in bearings 36 on the underside of the floor of the truck, may be operated by a lever 37 at the outer end thereof, and it will be noted that normally these latches 27 extend outward as shown in Figure 6, with the hinge of the tailboard resting thereon, and when it is desired to lower the tailboard the lever 37 is moved toward the end of the truck so that it will withdraw all of the latches 27 through the shaft 35, and the yoke members 34, so that the member 3 may drop downward, and then, after the tailboard has moved downward the latches may be released.

In the design shown in Figure 2, the chains are shown with their inner ends connected to a piston rod 38 of a piston 39 in a cylinder 40, and the inner end of the piston is connected by a tube 41 through a valve 42 to the vacuum of the engine of the truck, upon which the device is mounted, and this valve may be controlled by a lever 43 extending from the truck. The opposite end of the cylinder 41 may also be provided with a release valve 44, which may be operated by a lever 45, and it will be noted that vacuum in the cylinder will normally hold the tailboard upward, and it may be lowered by relieving this vacuum through the valve 44 by the handle 45, and when it is desired to raise the tailboard the valve 42 may be opened, and the suction of the engine will draw the piston inward, thereby raising the tailboard through the chains 18 and 19. In the design shown in Figure 7 the tailboard mounting is connected by chains 46 to a compression cylinder 47, which may be connected by a pipe 48 to a pump, compression tank, or any source of a fluid under pressure, and the connection may be provided with a control valve 49 as shown. In this design the chains or cables, as indicated by the numeral 46, pass around a drum 50, connected by worm gears 51 to a shaft 52, which may be rotated by a motor 53, or by hand as shown in Figure 1, so that mechanical means may be provided for lowering the tailboard, and this may be used in combination with a compression cylinder, as indicated by the numeral 47, for raising the tailboard. In this design, a cable or chains 46 pass under idlers 54, and over idlers 55, and are then connected to the lower ends 56 of sliders similar to the sliders 7 and 8, as shown at the point 57; and the tailboard, which is indicated by the numeral 58, is mounted upon the sliders through hinges 59, or by any other suitable means.

In the design shown in Figures 1 and 2, means is provided for closing the tailboard, in which cables or chains 60 and 61 are attached to the chains 13 and 14, and these pass inward on the inside of the sides of the truck, and downward through openings through the floor where they are connected to spring drums 62 and 63, on a shaft 64, and the shaft is provided with clutch members 65 and 66, so that a crank 67 on the end thereof may be pressed inward until the clutch members engage the members 62 and 63, so that the chains 60 and 61 may be wound upon these members to draw the chains 13 and 14 inward, thereby raising the tailboard to the closed position where it may be held by any suitable means, and in the design shown the truck is provided with an upper door 68, which may be held by side braces 69, however, it will be understood that the upper part may be provided with any suitable closing means.

In Figure 1 the tailboard elevating means, which is operated by the lever 24, may also be provided with a latch 70 by which it may be locked in addition to the worm gears, and the crank 67 for closing the tailboard may also be provided with a similar latch 71 for locking the tailboard in a closed position.

In Figure 8 operating mechanism of an alternate design is shown, in which the sliders 72, similar to the sliders 7 and 8, are formed with gear racks 73 in their edges, and these racks mesh with gears 74 on a shaft 75, and the shaft 75 is provided with a worm gear 76 meshing with a worm 77 on a shaft 78, and the shaft 78 may be rotated by a crank 79 on a shaft 80 through worm gears 81. It will be understood that with gears 74 meshing with racks in the sliders 72 at each side of the truck body, and with these gears operated by the worm gears, the tailboard may readily be raised and lowered by a crank 79 on one side, and the double worm gears will provide positive locking means for holding the tailboard in substantially any position. It will be understood, however, that the latches 27 may also be used in combination with this mechanism.

The underside of the truck may be provided with braces behind the sliders 7 and 8 formed with vertical bars 82 hinged at the points 83 and held by folding braces 84, which will permit the bars 82 to fold under the truck floor when not in use.

An automatic latch may also be provided for stopping the operating mechanism as the tailboard reaches the upper or normal position, and although two designs of latches are shown in Figures 2 and 7, it will be understood that any means may be used for stopping the motor or other mechanism. In Figure 2 a lever 85 is pivotally attached to the under side of the truck at the point 86, and the outer end thereof is attached to the valve operating lever 43 by a rod 87, and it will be noted that as the cables or chains 18 and 19 bring the tailboard to the upper position, an eye 88 on the piston rod 38 will engage the lever 85 and close the valve 42, thereby stopping the movement thereof.

In the design shown in Figure 7, the device is provided with a lever 89 on a shaft 90, and this is positioned so that the end 91 will be engaged by the part 57 of the slider, thereby moving this end of the lever upward, and the opposite end downward so that the opposite end will be disengaged from a contact point 92, and as these contact points may be connected in the motor circuit through wires 93 and 94, the circuit to the motor will be broken, so that the motor will stop as the tailboard reaches the normal or upper position. It will also be understood that this device may operate a clutch, or any suitable means for stopping the elevating mechanism when the tailboard arrives at the position shown in full lines in Figure 4.

It will be understood that other changes may be made without departing from the spirit of the invention. One of which changes may be in the use of other means for attaching the inner edge of the tailboard to the floor or sides of the truck, another may be in the use of other means for operating the sliders 7 and 8, and still another may be in the use of other operating connections and means in combination with the raising and lowering means for locking the respective parts in different positions.

The construction will be readily understood from the foregoing description. In use the device may be provided as shown and described, and installed on a truck having a tailboard, and it will be noted that the tailboard may readily be opened and used in the normal manner, however, when it is desired to lower a substantially heavy object from the truck, the tailboard may readily be lowered by levers in the side of the truck, and the lowering thereof may be positively controlled, so that it may be stopped, locked and held in substantially any position, or at susbtantially any point between the floor of the truck and ground, or other surface upon which the truck is standing. This mechanism makes it possible to positively hold the tailboard from a plurality of points, with exactly the same force holding the tailboard at every point, and as these forces are controlled from a common point, and by common operating means, both sides of the tailboard are elevated or lowered simultaneously, and by a common operating lever or handle.

Having thus fully described the invention, what I claim as new, and desire to secure by Letters Patent is:

1. In a tailboard mounting of the elevating type, sliders slidably mounted in tracks in the rear edges of the sides of the truck, means pivotally mounting the tailboard of the truck upon said sliders, and common means raising and lowering said sliders, said device characterized in that the lower ends of said sliders extend below the tailboard, and the raising and lowering means include chains attached to the extended ends of the sliders, and passing backward over pulleys below the surface of the floor of the truck.

2. A tailboard mounting as described in claim 1, characterized by means locking the said operating mechanism, with the tailboard in substantially any position.

3. In combination with a tailboard mounting as described in claim 1, means locking the said tailboard mounting in the upper position.

4. In combination with a tailboard mounting as described in claim 1, resilient latches rigidly supporting the tailboard mounting, with the tailboard in the normal position, and means operating said latches to release the tailboard.

5. In combination with a tailboard mounting as described in claim 1, means for closing said tailboard.

6. In combination with a tailboard mounting as described in claim 1, mechanical means for lowering said tailboard.

7. A tailboard mounting for trucks and the like, comprising tracks at the rear edges of the sides of the truck body, sliders in said tracks, means rigidly mounting the said tailboard on the lower ends of said sliders, side holding chains connected to the edges of said tailboard and to said sliders through slots in said tracks, for holding the tailboard in substantially a horizontal position, and means raising and lowering said sliders, said raising and lowering means characterized in that the ends of the sliders extend below the tailboard and the elevating means are attached to said extending means.

8. A tailboard mounting as described in claim 7, having collapsible braces extending downward from the floor of the truck body to engage the rear surfaces of said sliders, said braces adapted to fold against the under side of the truck.

9. In combination with a tailboard mounting as described in claim 7, additional side chains connected to the said former side holding chains, and also connected to drums adapted to be rotated to draw said former side chains inward to close the tailboard.

10. In combination with a tailboard as described in claim 7, rigid latches slidably mounted on the under side of said truck body extending under the edge of said tailboard, holding said tailboard in the normal upper position.

11. In combination with a tailboard as described in claim 7, rigid latches slidably mounted on the under side of said truck body extending under the edge of said tailboard, holding said tailboard in the normal upper position, and means withdrawing said latches to release the tailboard.

FRANK RICHTER.